United States Patent
Badovinatz et al.

[11] Patent Number: 5,991,821
[45] Date of Patent: *Nov. 23, 1999

[54] METHOD FOR SERIALIZING ACTIONS OF INDEPENDENT PROCESS GROUPS

[75] Inventors: Peter Richard Badovinatz, Kingston, N.Y.; Larry Bert Brenner, Austin, Tex.; Orvalle Theodore Kirby, Pleasant Valley, N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/640,220

[22] Filed: Apr. 30, 1996

[51] Int. Cl.$^6$ .................................................. G06F 11/00
[52] U.S. Cl. ............................................ 709/300; 709/226
[58] Field of Search ........................ 395/200.11, 200.53, 395/200.54, 200.55, 200.56; 709/100–106, 223–226, 300

[56] References Cited

U.S. PATENT DOCUMENTS

| | | | |
|---|---|---|---|
| 4,825,206 | 4/1989 | Brice, Jr. et al. | 340/825.02 |
| 5,426,774 | 6/1995 | Banerjee et al. | 395/575 |
| 5,495,479 | 2/1996 | Galaand et al. | 370/404 |
| 5,568,605 | 10/1996 | Clouston et al. | 395/182.02 |
| 5,606,669 | 2/1997 | Bertin et al. | 395/200.15 |
| 5,684,796 | 11/1997 | Abidi et al. | 370/389 |
| 5,684,807 | 11/1997 | Bianchini, Jr. et al. | 371/20.1 |
| 5,684,967 | 11/1997 | McKenna et al. | 345/329 |
| 5,774,669 | 6/1998 | George et al. | 709/224 |

OTHER PUBLICATIONS

T.K. Rengarajan et al., "High Availability Mechanisms of VAX DBMS Software", Digital Technical Journal, No. 8, Feb. 1989, pp. 88–98.

"Group Communication in the Amoeba Distributed Operating System", M. F. Kaashoek and A. S. Tanenbaum, Proc. of the IEEE 11th International Conf. on Distributed Computing Systems, pp. 222–230, 1991.

"Efficient Reliabe Group Communication for Distributed Systems", M. F. Kaashoek and A. S. Tanenbaum, Ph.D. thesis at the Vrije Universiteit, 1992, pp. 1–50.

*Primary Examiner*—Alvin E. Oberley
*Assistant Examiner*—St. John Courtenay, III
*Attorney, Agent, or Firm*—Floyd A. Gonzalez; Blanche E. Schiller; Heslin & Rothenberg

[57] ABSTRACT

Actions responsive to changes in the state of independent process groups whose process members are spread across a group of nodes in a distributed computing environment. The process groups are arranged in a hierarchy having source process groups and target process groups immediately above and dependent upon the source process groups. A change in the state or membership of a process group will result in a group services function of the nodes in the group injecting the change into the source group members of the affected group. When the action is successfully completed, the change is reflected up the hierarchy to the target group member or members. Upon successful action by the target group, the target group becomes the new source group which in turn may have target groups, and the changes are again reflected up the hierarchy to the new target groups.

13 Claims, 2 Drawing Sheets

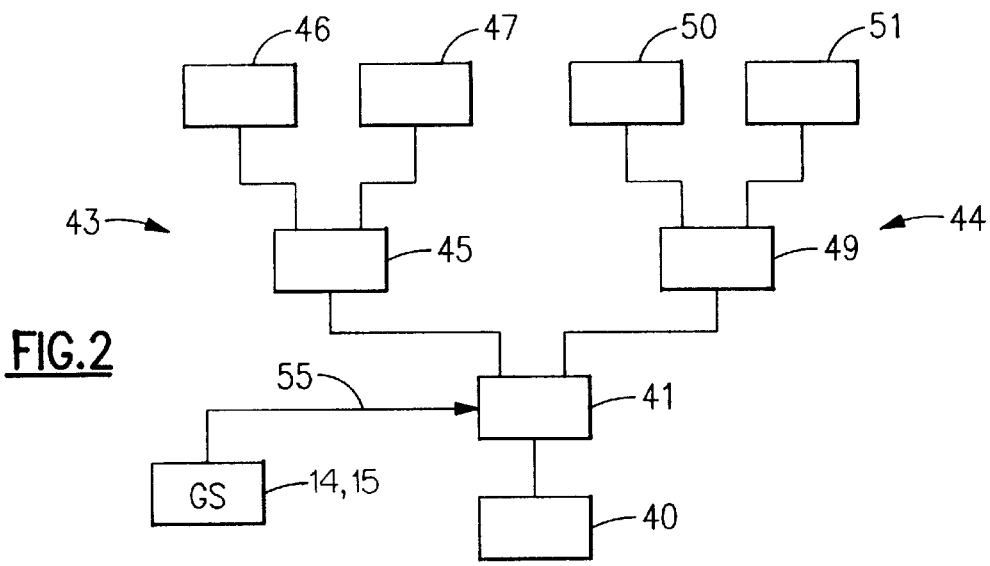
FIG.2
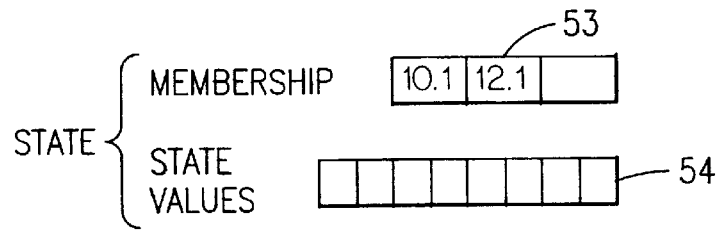
FIG.3
```
80 - PROCESSOR OF NODE 2 FAILS
81 - VSD PROCESS GROUP IN NODE 1 TOLD NODE 2 FAILED
     (CHANGE INJECTED)
82 - VSD DOES BARRIER SYNCHRONIZATION PROTOCOL TO
     RECOVER DISKS
83 - VSD SUCCESSFULLY COMPLETES PROTOCOL
84 - REFLECT TO DB IN NODE 1 THAT NODE 2 FAILED
85 - DB SUCCESSFULLY COMPLETES REQUIRED CHANGES
86 - REFLECT TO DB USERS IN NODE 1 THAT NODE 2 FAILED
```
FIG.5

METHOD FOR SERIALIZING ACTIONS OF INDEPENDENT PROCESS GROUPS

BACKGROUND OF THE INVENTION

The present invention relates to the operation of process groups by a group of nodes in a network of processing nodes, and more particularly relates to the serializing of actions of independent process groups by a group of nodes in a network of processing nodes.

When certain events occur in a processing node, such as the failure of a process or the failure of a node, it is desirable to serialize the actions of the process group in response to the event. In a parallel environment, each node in an assigned group of nodes has processes for processing data which may be replicated in other nodes. If the same process exists on more than one node, the common processes are referred to as a process group, and the individual process in each node is referred to as a process group member, or a member, or a process. If one node in the group fails, the other nodes in the group are notified such that the other nodes may pick up the work of the failing node, or otherwise accommodate the failure such that processing may continue.

In the past, when one node of a group failed, all process groups were forced to recover. Is some cases, an order was established such that one process recovered before a dependent process recovered. One such system is disclosed in "High Availability Mechanisms of VAX DBMS Software".

In some past systems, a distinction could not be made between a process failure and a node failure.

SUMMARY OF THE INVENTION

In the present invention, a Group Services function of the group of processing nodes arranges the process groups into a hierarchy. One embodiment of the hierarchy is a tree, with each process group below another process group or groups being the source process group, and the process groups above the source process group in the tree being target groups. In the present invention, the Group Services function of the nodes of a group of nodes detects a change in the status of one or more members of a process group, such as process failure or failures, or the failure of a processor on which a process group member is executing, and injects the change into all the members of the process group. The changed state thus causes an action in all the members of the process group receiving the changed state. When the action is successfully completed, the changed state is reflected up the tree to the target process group or groups, as determined by the Group Services function of the nodes. Each target process group then starts an action responsive to the state change reflected up the tree. When a target process group successfully completes an action, it becomes the source process group, and the state change is in-turn reflected up the tree to its target process group or groups.

It is therefore a primary object of the present invention to serialize the actions of independent process groups.

It is a further object of the present invention to inject a state change into a hierarchy of process groups, and serialize the actions of the process group members responsive to the state change.

It is a further object of the present invention to reflect the state change of a process group up a hierarchy of process groups only upon the successful completion of an action of the process group receiving the state change.

It is another object of the present invention to initiate an action by a process group independent of the process groups below or on parallel branches of a hierarchy of process groups arranged into a tree of process groups.

It is another object of the present invention to provide for serializing actions of independent processes arranged in a hierarchy of processes in one node of a group of processing nodes when one of the other nodes in the group fails.

It is another object of the present invention to provide for serializing actions of independent process groups arranged in a hierarchy of process groups when one of the process group members fails.

It is another object of the present invention to provide for serializing actions on independent process groups arranged in a hierarchy of process groups when the state of the source process group is changed by an application programming interface.

The foregoing and other objects, features and advantages of the invention will be apparent from the following more particular description of the preferred embodiment of the invention as illustrated in the drawings.

BRIEF DESCRIPTION OF THE DRAWINGS

FIG. 2 is a schematic drawing of a plurality of process groups wherein the process groups are arranged in a tree, and showing a state change injected into one of the process groups by the Group Services functions of the nodes in a group of nodes;

FIG. 3 is a representation of the state information maintained for each process group by the Group Services function;

FIG. 5 is a chart showing the flow of injecting a state change into the hierarchy of processes of one of the nodes of FIG. 1, and the reflecting of the state change up the hierarchy.

DESCRIPTION OF THE PREFERRED EMBODIMENT

Figure 1:
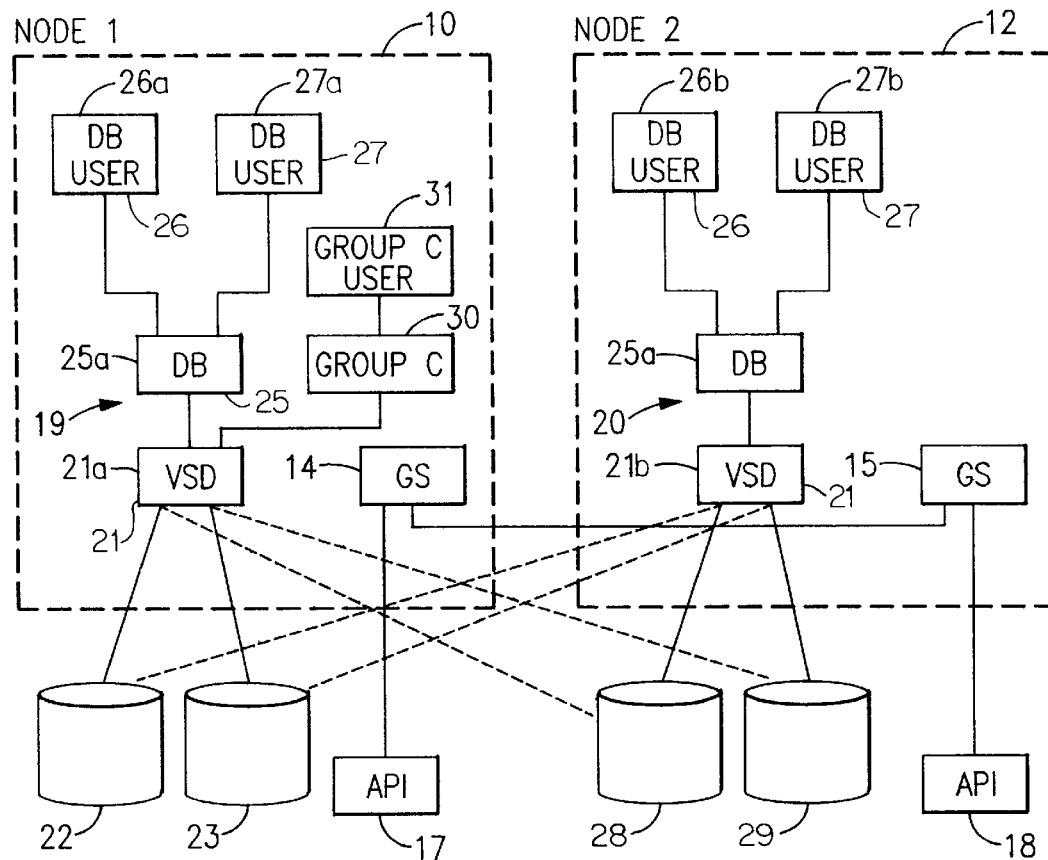
FIG. 1 is a schematic drawing of two nodes in a group of processing nodes according to the present invention.

FIG. 1 shows two nodes of the present invention, a first node 10 and a second node 12. Nodes 10 and 12 may be nodes in a distributed processing system such as an IBM RISC system/6000 Scalable POWERparallel systems (SP) computer. In the SP computer, each node is a RISC System/6000 workstation. However, the nodes may be multiple processors in a single node in a distributed processing system or clusters of processors which make up a single node in a distributed cluster processor system.

The nodes 10 and 12 are members of a group of nodes in a distributed processing system as described in U.S. patent application Ser. No. 08/641,386, issued on Aug. 4, 1998 as U.S. Pat. No. 5,790,772, for A Communications Method Involving Groups Of Processors Of A Distributed Computing Environment by P. R. Badovinatz et al., owned by the assignee of the present invention and incorporated herein by reference. Each of the nodes 10 and 12 includes a Group Services (GS) function 14 and 15 respectively. The Group Services function 14 and 15 act to synchronize and control the operation of processes in the nodes 10 and 12, as explained in U.S. patent application Ser. No. 08/640,412, issued on Jul. 28, 1998 as U.S. Pat. No. 5,787,249, for A Method For Managing Membership Of A Group Of Processors In A Distributed Computing Environment by P. R.

Badovinatz et al., owned by the assignee of the present invention and incorporated herein by reference. The Group Services functions 14 and 15 are each connected to application programming interfaces (API) 17 and 18 respectively. The API is as disclosed in U.S. patent application Ser. No. 08/640,305, for An Application Programming Interface Unifying Multiple Mechanisms by P. R. Badovinatz el al., owned by the assignee of the present invention and incorporated herein by reference. The APIs 17 and 18 are used by the processor group members on the nodes with Group Services to form the processes into process groups and exploit Group Services functions, as will be discussed further herein.

Each node 10 and 12 includes a set of independent processes 19 and 20 for performing functions and tasks to process data, as is well known. Common process members across the group of nodes are then arranged into process groups by the Group Services of the nodes. For example, one process group 21 may be the IBM Virtual Shared Disk (VSD) product which is used to control the reading and writing of data on Direct Storage Access Devices (DASD) during the processing of data. The VSD process group 21 is made up of VSD process member 21a in node 10, and 21b in node 12. The VSD group member 21a controls DASD devices 22 and 23, while VSD group member 21b controls DASD devices 28 and 29. Each VSD process member is able to control the DASD devices of another VSD process member in case of failure, as shown by the dotted lines in FIG. 1. Thus, VSD process member 21a is able to control DASD devices 28 and 29 if VSD process member 21b fails, and VSD process member 21b is able to control DASD devices 22 and 23 in the event that VSD process member 21a fails.

Dependent on the VSD process group 21 is the Data Base (DB) process group 25 which uses the VSD process group 21 to arrange and store data in a data base application. The DB process group 25 is made up of DB process member 25a in node 10, and 25b in node 12. Such database applications are well known and may be those of, for instance, the Oracle Company of Redwood City, Calif. Dependent on the DB process group 25, may be DB user process groups 26 and 27 which make use of the database files built by the DB process group 25, as is well known. The process group 26 includes DB user process member 26a of node 10 and DB user process member 26b of node 12, and the process group 27 includes DB user process member 27a of node 10 and 27b of node 12.

It will be understood that each node may contain members of more than one process group. For, example, the processes 19 in node 10 may include process group members 30 and 31 which are members of a Group C. It will be noted that Group C members are not in the processes 20 of node 12. Group C member 30 is dependent on VSD member 21a, and Group C User member 31 is dependent on Group C member 30.

The hierarchical arrangement of the processes 19 and 20 are arranged into trees. It can be seen that process groups are dependent on those process groups lower in the tree but are independent from those process groups in parallel branches of the tree or higher in the tree. For instance, the database process member 25a and Group C process member 30 are dependent upon the VSD process member 21a of process set 19, but are independent from each other. Further, the database process member 25a is independent of the actions of process members 26a and 27a. However, process members 26a and 27a are dependent upon database process member 25a. Also, Group C user process member 31 is independent of the actions of database user process members 26a and 27a, however, it is dependent on the Group C process member 30.

Even though the process members 21a through 31 are shown in a tree structure, there need be no knowledge of this structure in the process group members themselves. The relationship of the process groups is maintained by Group Services 14 of node 10. Similarly, the relationships of process members 21b through 27b are kept by Group Services 15 of node 12.

FIG. 2 is a schematic representation of a tree structure in which process groups in a group of nodes may be arranged. In the tree structure of FIG. 2, process groups 40 and 41 have a relationship wherein process group 41 is dependent on process group 40, however, process group 40 is independent of process group 41. As shown in the tree, process group 40 is lower in the tree than process group 41. Above process group 41, the tree divides into two branches 43 and 44. The branch 43 includes process group 45 which is dependent upon process group 41. Process groups 46 and 47 are dependent upon process group 45, and are independent from each other. In a similar fashion, branch 44 includes process group 49 from which depend process groups 50 and 51. Each process group has a source-target relationship. Each process group directly below a particular process group may be referred to as a source process group. Each process group directly above a source process group may be referred to as a target process group. Thus, if a particular process group, such as process group 41, is picked as a source, the target process groups would be process groups 45 and 49. If process group 49 is picked as the source process group, the target process groups would be process groups 50 and 51. As discussed above, a similar relationship exists in FIG. 1 between process members in process member sets 19 and 20.

As mentioned in connection with FIG. 1, the Group Services function of each node maintains the relationship between process members of the process groups. For each process member, the Group Services function also keeps a process group state field made up of membership information and state values, as shown in FIG. 3. The membership information kept for each process group indicates which processes are in the process group. Thus, for each member of the process groups of node 10 and node 12 (assuming nodes 10 and 12 form one group) the membership list includes the notations 10 and 12, to identify the nodes, and a digit after a decimal point to identify the process group member, as shown at 53 of FIG. 3. For instance, if the VSD process group member 21a is identified as process 1 on node 10 and VSD process group member 21b is identified as process 1 on node 12, then the membership list for the VSD process group 21 should be 10.1, 12.1. Also kept in the state field is a group of state values 54. These state values include multiple entries which reflect the state of the process group. The state values 54 contain information assigned by the process group members. Examples include indications such as 'active', 'inactive' and 'suspended', which indicate the status of the process group members. These may be used in any fashion as determined by the process group. The Group Services function insures that the state fields for a process group are consistent across the group for each member of the group.

It will be understood that the state values of a target process group may not be the same as the source process group, but may be derived from the state values of the source process group.

Returning to FIG. 2, when there is a change in the state field, including changes in membership information or one of the state values, this fact is injected into each process member of the group at the lowest level in the tree affected by the state change. Changes that are injected may be the result of a failure of a process member, failure of a node, or a change in a state value requested by a process member of the process group.

If Group Services of a member node detects that a process member in group 41 failed (for instance in the embodiment of FIG. 1, Group Services 14), this change is injected into the other members of the process group 41 by their Group Services function (in the embodiment of FIG. 1, the Group Services function 15) as shown in FIG. 2 at 55. This failure requires that the individual members of the affected process group take some action. When the action, such as recovery, has been successful, the state field change is reflected up the tree to the target group processes of process group 41.

A process member of a process group may request that the state values of the process group be assigned or modified. This request may come about because of a command sent to Group Services through the mentioned API by a process group member. The requested state change is then injected by Group Services into a process group whose member made the request.

There are two types of actions which may be performed by a process member, those which are reflected up the tree and those which are not. If an action is one which may have an effect on the target processes, then upon the successful completion of the action, the state field change to the source process group is reflected up the tree to the target process groups. If the action is a private action wherein the action affects only the process group where it is injected, the action is not reflected up the tree to the target process groups. A private action might be a join, or a group message action, as disclosed in patent application Ser. No. 08/640,218, issued on Jun. 16, 1998 as U.S. Pat. No. 5,768,538 for Method For Barrier Synchronization In A Distributed Computing Environment by P. R. Badovinatz et al., assigned to the assignee of the present invention and incorporated herein by reference.

Thus, any changes to any portion of the group's state values need to be reflected up the tree. For example, the process group members may decide to modify the state values from 'inactive' to 'active', and this change will be reflected.

It will be understood that actions are not reflected up the tree until the actions of the process members of the group in which the state changes are injected are accepted. Returning to FIG. 1, if the state field change is a detected failure of the VSD process member 21a in node 10, Group Services 14 will notify Group Services 15 of node 12 that member 21a has failed. Group Services 15 will then inject into group member 21b a change in the membership list 53 to indicate a failure. The process member 21b will then attempt to recover. This fact will not be reflected up the tree until process member 21b has recovered or, if it is unable to recover, that its state is changed to indicated it also has failed. When the action of process member 21b is accepted, the change in the state field of that process group is reflected to the target process member 25b of the process member 21b.

If the VSD process member 21b was successfully recovered, this change might require the database process member 25b to take certain actions such as verifying that the data it has received from the VSD process member 21b is valid, or that VSD process member 21b can now access data in DASD devices 22 and 23 in its backup condition. After the VSD process member 21b takes control of DASD devices 22 and 23, this act is reflected up its tree to target process member 25b. In that event, process member 25b and process member 26b and 27b dependent thereon, may use data from DASD devices 22 or 23.

At the same time, the successful completion of the action, that is that the VSD process member 21a has failed, is reflected to the process group 25a which requires that the process member 25a be "castout" of the process group 25, to thereby become inoperative. The fact that process member 25a has been castout must be reflected up the tree to database user process members 26a and 27a, who are in turn castout of groups 26 and 27, respectively.

It will thus be understood that an action which is brought about by a change in the state field must be successfully completed before the results of that action are reflected up the process tree. In many cases, the process group dependent upon a source process group will not know which action to take until the action of its source process group has successfully completed it.

State changes are reflected up the tree in the following cases:

1) a source group assigns a value to or modifies its state field;

2) a source group member leaves its process group (due to failure or it requests to leave) and this is the last source group member on that node, and the target group/s have one or more members on that node;

3) a node fails, and all affected target groups will see it; and 4) a state field is changed as part of dealing with a failure, and the state field change has to be reflected to the target group/s.

There are several situations in which an action being reflected up the tree will be converted into a private action which is not reflected. One situation is where a process member has a target member which is not in the process group reflecting actions. Such a situation is shown in node 10 of FIG. 1 wherein Group C member 30 is dependent on VSD member 21a. However, VSD member 21b of node 12 does not have a dependent member corresponding to member 30. It will be understood that if VSD member 21b fails, and VSD member 21a successfully completes an action, the action will not be reflected to Group C member 30 because it will be unaffected by the failure of VSD 21b. However, the action will be reflected to database group member 25a.

If VSD member 21a modifies its state values due to the failure of member 21b, then Group C member 30 will see the change reflected. However, if VSD member 21a does not modify its state values due to the failure of member 21b, then no changes will be reflected to Group C member 30. If a target group is also a source group, such as Group C member 30, and sees a reflected change but does not change its own state values, then nothing will be reflected up the tree from the Group C member 30 to the Group C user member 31.

Figure 4:
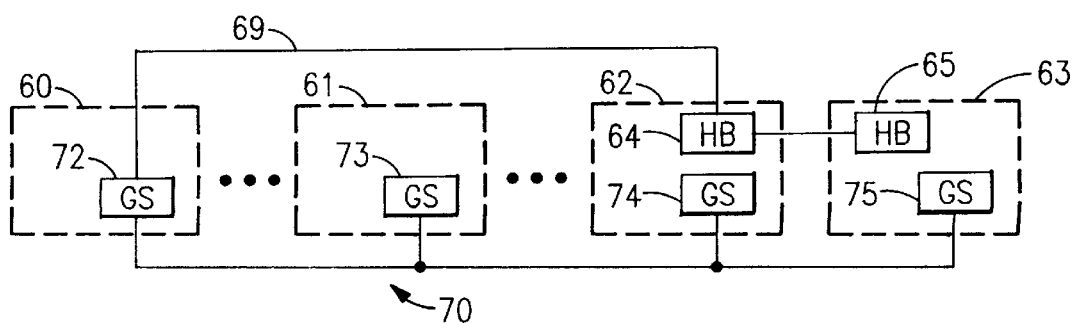
FIG. 4 is a schematic diagram of a group of processing nodes illustrating the detection of the failure of one of the nodes in the group.

In addition to mentioned changes in the process groups themselves, the failure of a node in a group of nodes may be detected and reported to the tree by the Group Services of the remaining nodes in that group. FIG. 4 is a schematic representation of the system for detecting the failure of a node in a group of nodes. In FIG. 4, nodes 60 through 63 are members of group 70. The nodes, such as nodes 62 and 63, are paired, and each node includes a heartbeat function 64 and 65 respectively for detecting if the node is still functioning. The heartbeat function 64 and 65 regularly report to their nearest neighbor that they are still alive and functioning. If a heartbeat function, for instance 64, determines that the heartbeat function 65 of node 63 is no longer functioning, the failure of node 63 is reported by the heartbeat function 64 of node 62 to the group leader, in this case node 60 of group 70. When the Group Services 72 of the group leader node 60 receives the notification, represented at 69, that the node 63 has failed, this failure is reported by Group Services 72 to all of the other Group Services 73 through 75 of the other remaining nodes in the group 70. Returning now to FIG. 1, when Group Services 14 of node 10 is informed that a member of the group has failed, Group Services 14 injects this state field change to the lowest member of the process tree 19 affected, in this case VSD process member 21a. In this case, Group Services 14 removes all processes of the failing node from the membership list 53, and the process member 21a takes whatever actions are necessary to correct or accommodate this membership change. When the process member 21a successfully completes the actions required, the state field change is reflected up the tree to the target process members 25a and 30. If the target process members 25a and 30 have no members that were affected, they do not see a membership change, i.e. Group Services will not inject the membership change into the unaffected process groups. However, if an affected group does change its state value 54, then that portion of the change will be reflected. When the actions, if any, have been successfully completed, the target process groups then become the source process groups, and the membership change is reflected up the tree to their target process groups, and so on. In this case, process 30 would convert the action to a private action, and not reflect the action up the tree since the failing node is not in the membership list 53 of process 30.

FIG. 5 illustrates the flow caused by the failure of node 12 of FIG. 1 upon the DB branch of the tree 19 of node 10. In the example of FIG. 5 at 80, the processor of node 12 fails. At 81, the VSD process member 21a in node 10 is told that the process member 21b has failed due to the failure of node 12. This is done by the injection of a state field change by Group Services 14 into the VSD process member 21a. At 82, process member 21a does barrier synchronization protocol to recover the disks. The barrier synchronization is disclosed in the aforementioned U.S. patent application Ser. No. 08/640,218, issued on Jun. 16, 1998 as U.S. Pat. No. 5,768,538 for Method For Barrier Synchronization In A Distributed Computing Environment by P. R. Badovinatz et al., owned by the assignee of the present invention and incorporated herein by reference. At 83, the VSD process member 21a successfully completes the protocol to recover the disks 28 and 29. At 84, the failure of process member 25b due to the failure of node 12 is reflected up the tree to the database process member 25a in node 10. At 85, the database process member 25a successfully completes any required changes brought about by the failure of process member 25b. At 86, the failure of process members 26b and 27b due to the failure of node 12 is reflected to the database user process members 26a and 27a.

It will be understood that the described invention provides for serializing actions of independent process groups such that only those process groups that are affected or otherwise dependent upon a change are involved. Furthermore, the process groups which are dependent upon the change will not start their recovery or other action until the successful completion of actions of process groups on which they depend. Further, those process groups which are unaffected by any changes will not have such changes injected into them to act on.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A method for serializing actions of independent process groups, said method comprising:
   (a) arranging independent process groups into a hierarchy wherein process groups are dependent on those process groups lower in the hierarchy and independent from process groups higher in the hierarchy, wherein an action occurring in a process group higher in the hierarchy has no affect on any process group lower in the hierarchy, but does affect at least one process group higher in the hierarchy;
   (b) injecting a state change into a process group in said hierarchy;
   (c) taking an action in the process group receiving the state change;
   (d) reflecting the state change to the next process group up the hierarchy;
   (e) performing an action in the next process group responsive to the reflected state change; and
   (f) repeating steps (d) and (e) to reflect the state change up the hierarchy.

2. The method of claim 1 further comprising repeating step (f) until the state change has been completely reflected up the hierarchy.

3. The method of claim 1 further comprising converting the action of either step (c) or (e) into a private action wherein the state change is not reflected further up the hierarchy.

4. The method of claim 3 wherein said private action affects only the process group where said state change is injected.

5. The method of claim 1 further comprising successfully completing the actions of steps (c) and (e) before reflecting the state change up the hierarchy in step (d), thereby serializing the actions of the process groups in the hierarchy.

6. The method of claim 5 wherein the action of step (c) is different from the action of step (e), as determined by the process group performing the action.

7. The method of claim 6 wherein the hierarchy of process groups is arranged into a tree of process groups, and the action of step (e) for a process group higher in the hierarchy is independent of the action of step (d) for a process group lower or in a parallel branch in the tree.

8. The method of claim 7 wherein the state change reflected up the hierarchy in step (d) is a state value different from the state change injected in step (b).

9. The method of claim 1 wherein each process group includes multiple members, and the state change injected into the hierarchy in step (b) indicates that one member of a process group has failed.

10. The method of claim 9 wherein the action of step (c) comprises successful recovery from the failure of the failed member before the state change is reflected up the hierarchy of step (d).

11. The method of claim 10 further comprising arranging said process group members on different nodes of a computer network, said failed member being on a node different from the node of at least one other member of the process group.

12. The method of claim 11 wherein said failed member fails because its node fails.

13. The method of claim 11 comprising reporting the state of a process group member on one node by way of an application program interface to members of the process group on other nodes, and monitoring the state of each member of a process group to detect the state change to be injected into a process group in step (b).

* * * * *